United States Patent
Benitez-Jimenez et al.

(10) Patent No.: US 7,146,349 B2
(45) Date of Patent: Dec. 5, 2006

(54) NETWORK FOR DESCRIBING MULTIMEDIA INFORMATION

(75) Inventors: Ana Belen Benitez-Jimenez, New York, NY (US); Chung-Sheng Li, Ossining, NY (US); John R. Smith, New Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 741 days.

(21) Appl. No.: 10/002,998

(22) Filed: Nov. 1, 2001

(65) Prior Publication Data

US 2002/0107827 A1    Aug. 8, 2002

Related U.S. Application Data

(60) Provisional application No. 60/246,052, filed on Nov. 6, 2000.

(51) Int. Cl.
  *G06F 17/00* (2006.01)
  *G06N 5/00* (2006.01)
(52) U.S. Cl. .......................................... 706/46; 706/45
(58) Field of Classification Search ................ 706/46, 706/55; 707/3; 382/190, 195; 717/143; 704/500, 9, 1
See application file for complete search history.

(56) References Cited

U.S. PATENT DOCUMENTS

| | | | | |
|---|---|---|---|---|
| 4,965,763 | A | * | 10/1990 | Zamora .......................... 704/1 |
| 5,251,129 | A | * | 10/1993 | Jacobs et al. ................... 704/9 |
| 5,263,126 | A | * | 11/1993 | Chang .......................... 706/46 |
| 5,802,508 | A | * | 9/1998 | Morgenstern ................ 706/55 |
| 5,806,060 | A | * | 9/1998 | Borgida et al. ................. 707/3 |
| 5,963,447 | A | * | 10/1999 | Kohn et al. .................... 700/49 |
| 5,983,237 | A | * | 11/1999 | Jain et al. ................. 707/104.1 |
| 6,112,201 | A | * | 8/2000 | Wical ............................. 707/5 |
| 6,246,977 | B1 | * | 6/2001 | Messerly et al. .............. 704/9 |
| 6,253,170 | B1 | * | 6/2001 | Dolan ......................... 704/10 |
| 6,405,162 | B1 | * | 6/2002 | Segond et al. ................. 704/9 |
| 6,411,724 | B1 | * | 6/2002 | Vaithilingam et al. ...... 382/100 |
| 6,493,692 | B1 | * | 12/2002 | Kobayashi et al. ........... 706/46 |
| 6,564,263 | B1 | * | 5/2003 | Bergman et al. ............ 709/231 |
| 6,598,018 | B1 | * | 7/2003 | Junqua ....................... 704/251 |

(Continued)

FOREIGN PATENT DOCUMENTS

EP    962873  A1 *  12/1999

OTHER PUBLICATIONS

Aslandogan et al; Using semantic contents and WordNet in image retrieval; Proceedings of the 20th annual international ACM SIGIR conference on Research and development in information retrieval; Jul. 1997; vol. 31 IS. SI.*

(Continued)

*Primary Examiner*—Anthony Knight
*Assistant Examiner*—Ronald E. Williams, Jr.
(74) *Attorney, Agent, or Firm*—Ido Tuchman; Anne Dougherty

(57) ABSTRACT

A method and apparatus for encoding knowledge using a multimedia network. A multimedia network represents semantic concepts and their relations using multimedia content. A multimedia network associates words and multimedia content with the semantic concepts in order to illustrate and exemplify the semantic concepts as well as describe lexical, semantic, and perceptual relations. The multimedia network can be searched, browsed, or summarized for purposes of information discovery. The multimedia network can also be used for personalizing multimedia content or for querying a multimedia information repository by expanding a query to include related concepts encoded in a Multimedia network.

20 Claims, 8 Drawing Sheets

U.S. PATENT DOCUMENTS

| | | | |
|---|---|---|---|
| 6,629,088 B1 * | 9/2003 | Rising, III | 706/12 |
| 6,721,697 B1 * | 4/2004 | Duan et al. | 704/9 |
| 6,819,797 B1 * | 11/2004 | Smith et al. | 382/181 |

OTHER PUBLICATIONS

Miller; WordNet: A Lexical Database for English; Communications of the ACM; Nov. 1995; vol. 38, No. 11; pp. 39-41.*

Smith et al; Visually searching the Web for content; Multimedia, IEEE; vol. 4, Is. 3; Jul.-Sep. 1997; pp. 12-20.*

Mohan et al; Adapting multimedia Internet content for universal access; Multimedia, IEEE Transactions on; vol. 1, Is. 1; Mar. 1999; pp. 104-114.*

Suzuki et al; A similarity retrieval of 3D polygonal models using rotation invariant shape descriptors; IEEE International Conference on Systems, Man, and Cybernetics; vol. 4; Oct. 8-11, 2000; pp. 2946-2952.*

Ohm; Flexible solutions for low-level visual feature descriptors in MPEG-7; Consumer Electronics, International Conference on; Jun. 13-15, 2000; pp. 282-283.*

Yang et al; A semantic classification and composite indexing approach to robust image retrieval; Image Processing, International Conference on; vol. 1; 1999; pp. 134-138.*

Church et al; Word association norms, mutual information, and lexicography; Computational Linguistics; Mar. 1990; vol. 16, Is. 1.*

Megalou et al; Semantic Abstractions in the Multimedia Domain; Computer Technology Institute; Technical Report No. TR99/09/06; 1999; pp. 1-37.*

Dimitrova; Multimedia Content Analysis and Indexing for Filtering and Retrieval Applications; Informing Science Special Issue on Multimedia Informing Technologies—Part 1; vol. 2, Is. 4; 1999; pp. 87-100.*

Delisle et al; Contexts-a partitioning concept for hypertext; ACM Transactions on Information Systems (TOIS); vol. 5, Is. 2; Apr. 1987; pp. 168-186.*

Sowa; Semantics of conceptual graphs; Proceedings of the 17th annual meeting on Association for Computational Linguistics; 1979; pp. 39-44.*

Eren et al; Interactive object-based analysis and manipulation of digital video; IEEE Second Workshop on Multimedia Signal Processing; Dec. 7-9, 1998; pp. 335-340.*

Ferman et al; Effective content representation for video; International Conference on Image Processing Proceedings; vol. 3; Oct. 4-7, 1998; pp. 521-525.* http://www.spie.org/web/meetings/programs/pw00/confs/3972.html; 2000; pp. 1-9.*

Aslandogan et al., "Using Semantic Contents and WordNet™ in Image Retrieval" SIGIR 97 Philadelphia, PA pp. 286-295.

Tansley et al., "Automating the Linking of Content and Concept", ACM Multimedia 2000 1-58113-198-4/00/10, Los Angleles CA pp. 445-447.

Joyce et al., "Semiotics and Agents for Integrating and Navigating through Multimedia Representations of Concepts", Multimedia Res. Group, Dept. of Electronic and Computer Science, Univ. Southampton, Southampton, Hampshire, Eng. S017 IBJ pp. 1-12.

Ma et al., "A Texture Thesaurus for Browsing Large Aerial Photographs", J. of Amer. Soc. of Information Science, 49(7) pp. 633-648 1998.

G. A. Miller, "WordNet: A Lexical Database for English", Communications of the ACM Nov. 1995 vol. 38 #11 pp. 39-41.

J. R. Smith et al., "Integrating Features, Models, and Semantics for Content-Based Retrieval" Proc. Multimedia Content-based Indexing and Retrieval Workshop, 2001.

Aslandogan et al., "Using Semantic Contents and WordNet™ in Image Retrieval" SIGIR 97 Philadelphia, PA pp. 286-295.

Tansley et al., "Automating the Linking of Content and Concept", ACM Multimedia 2000 1-58113-198-4/00/10, Los Angleles CA pp. 445-447.

Joyce et al., "Semiotics and Agents for Integrating and Navigating through Multimedia Representations of Concepts", Multimedia Res. Group, Dept. of Electronic and Computer Science, Univ. Southampton, Southampton, Hampshire, Eng. SO17 IBJ pp. 1-12, Jan. 26-28, 2000.

* cited by examiner

NETWORK FOR DESCRIBING MULTIMEDIA INFORMATION

CROSS-REFERENCE TO RELATED APPLICATION

This application claims the benefit of U.S. Provisional Patent Application Ser. No. 60/246,052, filed Nov. 6, 2000, incorporated herein by reference.

FIELD OF THE INVENTION

The present invention relates to the encoding of knowledge using a multimedia network and more specifically to a method and apparatus for representing semantic concepts and their relations by associating words and multimedia content with semantic concepts and by describing lexical, semantic, and perceptual relations. The present invention relates also to the use of a multimedia network for purposes of information discovery, personalizing multimedia content, and querying a multimedia information repository.

BACKGROUND OF THE INVENTION

The representation of knowledge is important for developing computerized systems for applications of decision support, information discovery and retrieval, and robotics and artificial intelligence. In the most general sense, real world knowledge can be represented by describing semantic concepts and their relations as well as the rules for manipulating them. With the availability of audio and visual content acquisition devices, multimedia content, which is understood as content in the form of images, video, audio, graphics, text, and any combination thereof, can find an increasing role in representing real world knowledge.

Audio-visual content is typically formed from the projection of real world entities through an acquisition process involving cameras and other recording devices. In this regard, audio-visual content acquisition is comparable to the capturing of the real world by human senses. This provides a direct correspondence of human audio and visual perception with the audio-visual content. On the other hand, text or words in a language can be thought of as symbols for the real world entities. The mapping from the content level to the symbolic level by computer is quite limited and far from reaching human performance. As a result, in order to deal effectively with audio-visual material, it is necessary to model real world concepts and their relationships at both the symbolic and perceptual levels by developing explicit representations of this knowledge.

Multimedia knowledge representations have been found to be useful for aiding information retrieval. The multimedia thesaurus (MMT) demonstrated by R. Tansley, C. Bird, W. Hall, P. Lewis, and M. Weal in an article entitled "Automating the Linking of Content and Concept", published in the *Proc. of ACM Multimedia*, Oct. 30–Nov. 4, 2000, is used in the MAVIS information retrieval system described by D. W. Joyce, P. H. Lewis, R. H. Tansley, M. R. Dobie, and W. Hall in an article entitled "Semiotics and Agents for Integrating and Navigating Through Media Representations of Concepts," published in *Proc. of Conference on Storage and Retrieval for Media Databases* 2000, (*IS&T/SPIE*-2000), Vol. 3972, pp.120–31, January 2000. The MMT consists of a network of concepts that are connected by traditional thesaurus relationships and sets of multimedia content that are used as signifiers of the concepts. The applications of MMT include expanding or augmenting queries in which a query might consist of a textual term such as "car", and the representation of that and narrower concepts are used to retrieve images of cars. However, the MMT does not address the aspect in which the perceptual relationships such as feature similarity among the multimedia signifiers contribute additional relations to the multimedia knowledge representation.

Alternatively, visual thesauri, which have been found to be useful for searching image databases, describe the similarity relationships between features of the multimedia content. W. Y. Ma and B. S. Manjunath in an article entitled "A Texture Thesaurus for Browsing Large Aerial Photographs," published in the *Journal of the American Society for Information Science (JASIS)*, pp. 633–648, vol. 49, No. 7, May 1998, described the use of a texture thesaurus, which encodes different types of textures and their similarity, for browsing an image database on the basis of the textural features of the images. However, while the texture thesaurus addresses the perceptual relationships among the textures, it does not address the aspect in which the textures are used as signifiers for concepts, nor does it associate other symbols such as words with the concepts.

The use of relationships among words can be exploited for image retrieval as taught by Y. Alp Aslandogan, C. Thier, C. T. Yu, J. Zon, N. Rishe in the paper entitled "Using Semantic Contents and WordNet in Image Retrieval," published in *Proc. of the* 20th *International ACM SIGIR Conference on Research and Development in information Retrieval*, pp. 286–295, 1997. The system allows the similarity searching ot images based on the semantic entity-relationship-attribite descriptions of the image content. WORDNET is used for expanding the query or database for matching. WORDNET is a registered trademark of Trustees of Princeton University, Princeton, New Jersey. The WORDNET system, taught by G. A. Miller in an article entitled "WordNet: A Lexical Database for English," published in *Communication of the ACM*, Vol. 38, No. 11, pp. 39–41, Nov. 1995, incorporated herein by reference, is a graphical network of concepts and associated words in which the relationships among concepts are governed by the form and meaning of the words. However, WORDNET and other textual representations of knowledge do not sufficiently address the audio-visual and perceptual aspects of the concepts they model. As a result, they have limited use for searching, browsing, or summarizing multimedia information repositories.

SUMMARY OF THE INVENTION

It is, therefore, an objective of the present invention to provide a method and apparatus for encoding of knowledge using a multimedia network that integrates concepts, relations, words, and multimedia content into a single representation. The multimedia network builds on WORDNET by providing additional signifiers of the semantic concepts using multimedia content and defining perceptual relations based on the features of the multimedia content.

It is another objective of the invention to use the multimedia network in applications of information discovery, personalizing multimedia content, and querying of a multimedia information repository.

The multimedia network represents real-world knowledge using concepts and relationships that are defined and exemplified with multimedia. The multimedia network can be used to facilitate the extraction of knowledge from multimedia material and improve the performance of multimedia searching and filtering applications. In the multimedia network, the concepts can represent real-world entities such as "car," "house," "tree." Furthermore, relationships can be conceptual (e.g., "specializes") and perceptual (e.g., "looks like"). The framework offers functionality similar to that of a dictionary or thesaurus by defining, describing and illustrating concepts, but also by denoting the similarity of concepts at the semantic and perceptual levels.

By integrating both conceptual and perceptual representations of knowledge, the multimedia network has potential to impact a broad range of applications that deal with multimedia content at the semantic and feature levels such as query, browsing, summarization, and synthesis. In particular, the multimedia network can improve the performance of multimedia retrieval applications through query expansion, refinement, and translation across multiple content modalities.

In accordance with the aforementioned and other objectives, the present invention is directed towards an apparatus and method for encoding knowledge using a media network knowledge representation and applying the encoded media network knowledge representation to problems of searching, browsing, summarizing, and personalizing information.

More particularly, a system, method and computer program product for encoding knowledge are described, comprising means for forming a network having logical nodes that represent semantic concepts; means for associating one or more arcs with one or more of the arcs associated with concept nodes; means for associating one or more words with one or more of the nodes; means for associating multimedia content with one or more of the nodes; and means for representing relationships between the nodes as arcs between associated words and arcs between associated multimedia content.

Further aspects of the invention provide means for searching the knowledge encoded in the network, means for browsing the knowledge encoded in the network; means for updating the knowledge encoded in the network; means for summarizing the knowledge encoded in the network; means for querying a multimedia information repository associated with the knowledge encoded in the network; and means for personalizing the knowledge encoded in the network for a particular user.

BRIEF DESCRIPTION OF THE DRAWINGS

The invention will hereinafter be described in greater detail with specific reference to the appended drawings wherein.

DETAILED DESCRIPTION OF A PREFERRED EMBODIMENT OF THE INVENTION

Figure 1:
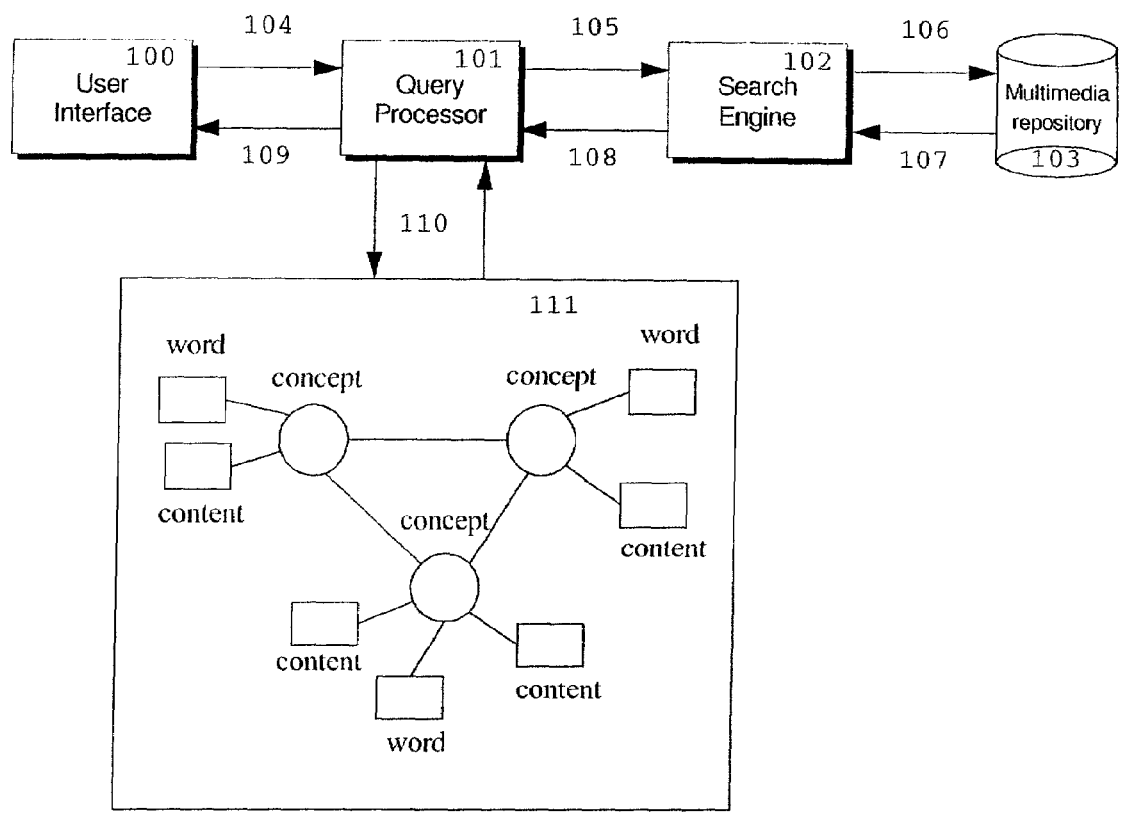
FIG. 1 shows a multimedia information retrieval system in which a query processor uses a media network knowledge representation.

FIG. 1 depicts a preferred embodiment of a multimedia information retrieval system having features of the present invention. As depicted, a user through a user interface (100) such as the Web-based graphical interface of the video retrieval system described by J. R. Smith, S. Basu, C. -Y. Lin, M. Naphade, and B. Tseng in "Integrating Features, Models, and Semantics for Content-based Retrieval," published in the *Proceedings of the Multimedia Content-based Indexing and Retrieval (MMCBIR) Workshop* in 2001, (incorporated by reference herein) issues a query in step (104) to a multimedia information retrieval system. The query is handled by a query processor (101), such as the video query processor described by Smith, et al., that processes content-based and model-based queries for video content. The query processor analyzes the query and in step (110) accesses a media network knowledge representation (111) constructed in accordance with the invention. The access may involve searching the media network knowledge representation using words or multimedia content descriptors. The results of the search may be additional words, multimedia content, or descriptors of the features of the multimedia content. The query processor further analyzes the results of accessing the media network knowledge representation and in step (105) issues a search to the multimedia search engine (102), such as the video content search engine described by Smith, et al., that searches target video shots to find the best matches to example images based on the values of the feature descriptors. The search engine in step (106) accesses the multimedia repository (103), which stores the multimedia content and the database records associated with the multimedia content, as well as the feature descriptors, and in step (107) retrieves multimedia content.

In accordance with the present invention, the media network knowledge representation (111) describes a knowledge base composed of concepts and their multimedia signifiers and relationships. The media network knowledge representation (111) is used in the system for improving the retrieval effectiveness of the system through processes such as query expansion or iterative refinement, or for customizing the retrieval results by summarizing or personalizing the multimedia content.

In the case of query expansion, a user through interface (100) supplies an initial query to the query processor (101). The initial query may specify concepts or include terms or examples of multimedia content. This input can be used by the query processor (101) to first search (110) the media network knowledge representation (111) to retrieve concepts, content, terms, or feature descriptors related to the input. The results of this search (110) of the media network knowledge representation (111) are then returned to the query processor (101), which can use the results in conjunction with the user provided input to issue specific search operations (105) to the search engine (102). The multimedia can be returned directly to the user or, optionally, can be returned in step (108) back to the query processor, which can further access and search the media network knowledge representation (111) and based on the results from the media network, issue another search to the multimedia search engine (102). This process can be repeated, each time retrieving content from the repository, using the media network knowledge representation to analyze the retrieved content, and refining the search operations sent to the search engine (102).

The determination of whether the search needs to be refined can optionally be made by the user. For example, before refining the search, the system can display the multimedia retrieval results from the search engine (102), or the concepts, content, terms, or feature descriptor results from the media network knowledge representation (111), and give the user the choice to refine the search. Furthermore, the system can give the user the option to select some of the concepts, content, terms, or feature descriptors to be used for the search.

The determination of the whether the search needs to be refined can also optionally be made by the query processor (101). For example, the query processor may use a fixed number of iterations, such as three iterations in which it accesses the media network knowledge representation (111) and issues searches to the search engine (102). Alternatively, the query processor (101) may impose a limit on the total number of concepts, content, terms, or feature descriptors accessed from the media network knowledge representation (111) and used for searching, and once this threshold is reached, the refinement is terminated. Alternatively, the query processor (101) may refine the query repeatedly until a certain number of results are returned from the search engine (102).

In accordance with the invention, the processes running in the search system access concepts from the media network knowledge representation using signifiers which can be words, multimedia content, or feature descriptors.

Figure 2:
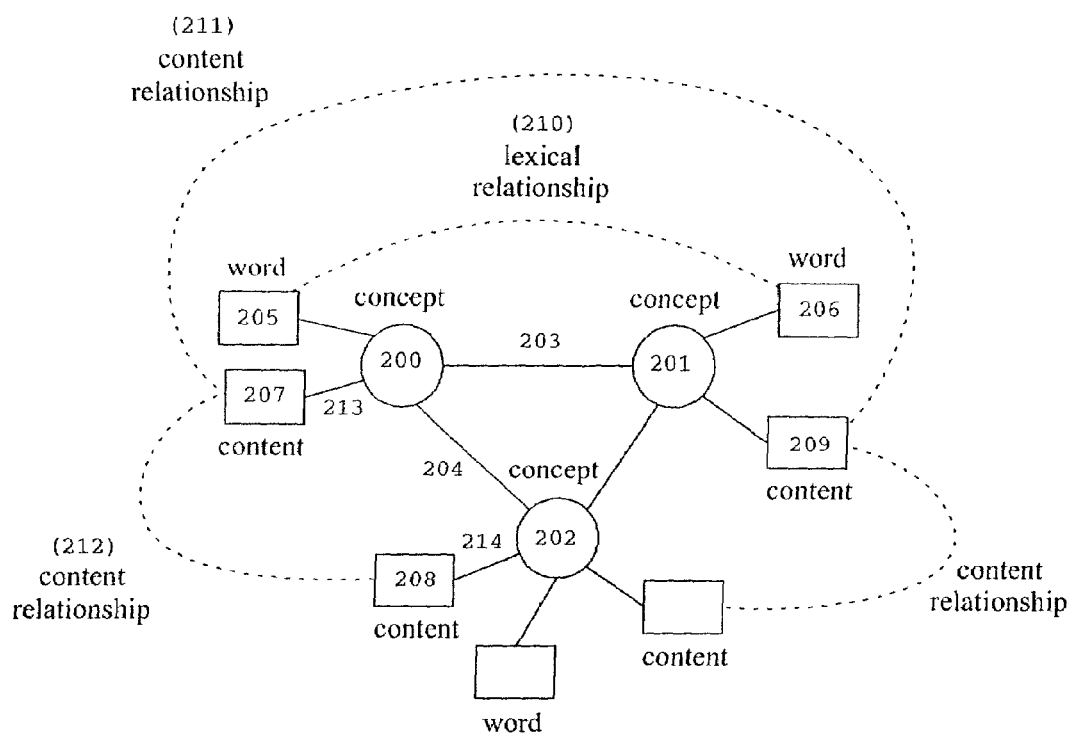
FIG. 2 shows a graphical representation of a media network knowledge representation.

The multimedia content-based retrieval system may also be used to personalize or summarize the multimedia content in the multimedia repository (103) using the media network knowledge representation. In the case of personalization, the input from user (104) may come in the form of user preferences or information about the user environment, such as spatial and temporal context, user device, bandwidth, connectivity, and so forth. In this case, the user preference in conjunction with any user provided query information can be combined to access the multimedia repository using the same procedure as for search. However, the personalization and summarization processing may further manipulate the results before returning them to the user in step (109) by creating a new multimedia presentation from those items retrieved from the multimedia repository (103). For example, the user may prefer to watch the "soccer goal score" scenes from sports video. This preference may be stored and associated with a user and used in combination with a user query that requests soccer video highlights for a particular video. The search process would retrieve the particular video highlights, and then compose them together according to the user preferences to display only the preferred highlights. Referring to FIG. 2, there is shown an encoding of the media network knowledge representation (111) of the present invention. The media network represents concepts (200, 201, 202) and their signifiers, which may be words (205, 206) and content (207, 208, 209), as nodes. The media network represents relationships, which may be semantic and lexical relationships (210), content relationships (211, 212), and feature relationships as arcs between the nodes. The graphical representation shown in FIG. 2 is helpful in visualizing the media network knowledge representation, however, in practice, the media network knowledge representation can be fully represented using any computer data structures that allow modeling of graphs or networks.

Figure 3:
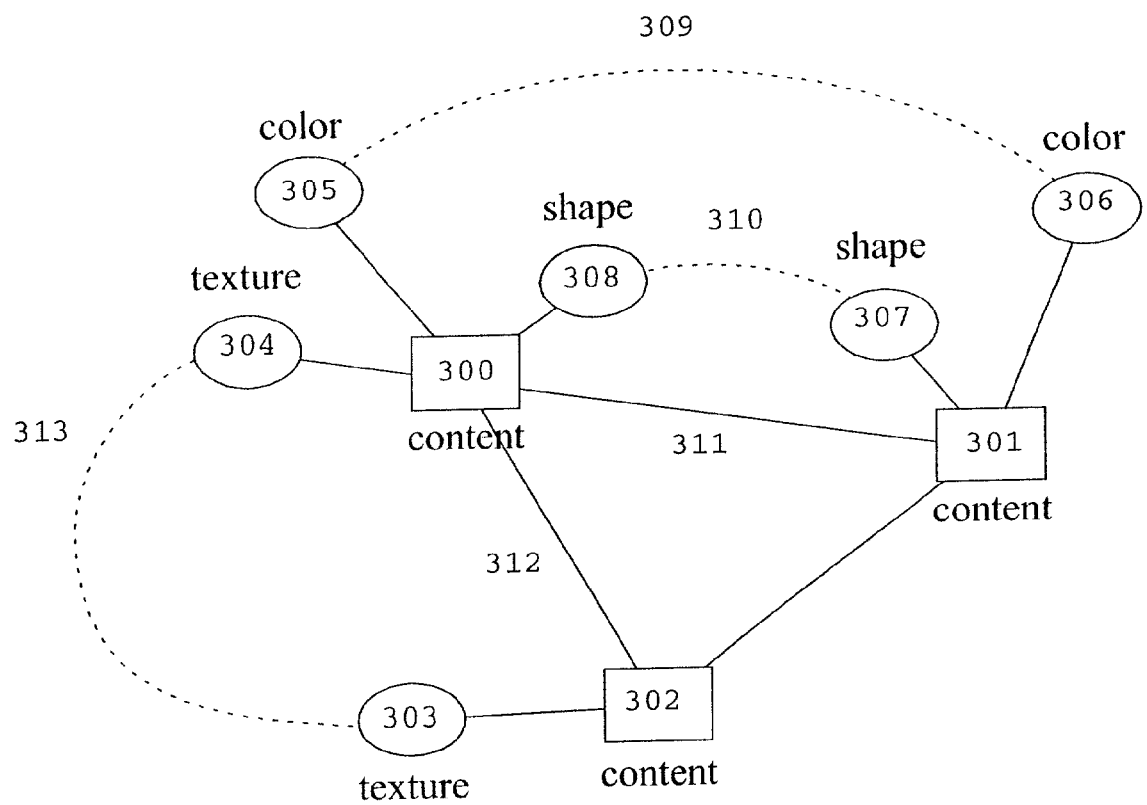
FIG. 3 shows a graphical representation of content nodes in a media network knowledge representation as well as the feature descriptors and perceptual relationships.

Referring to FIG. 3, there is shown an encoding of the content and feature relationships in the media network knowledge representation (111). The multimedia content is represented as nodes (300, 301, 302). The features of the content, such as audio-visual features and descriptors, are associated with each content node. Example nodes representing features and descriptors include the nodes for color (305, 306), texture (303, 304), and shape (307, 308). Furthermore, the similarity of, or distance between, the features, which is represented as an arc between the feature and descriptor nodes, provides a set of feature or content relationships. For example, a color similarity relationship is given by arc (309) between nodes (305) and (306). A texture similarity relationship is given by arc (313) between nodes (303) and (304). A shape similarity relationship is given by arc (310) between nodes (307) and (308). These relationships can be used to define and propagate to the relationships (i.e., (311) and (312)) between the content nodes.

Preferably, the media network knowledge will be described using the ISO MPEG-7 Description Definition Language in which the concepts are described using the MPEG-7 Semantic Description Scheme, relations are described using the MPEG-7 Relation Description Scheme or MPEG-7 Graph Description Schemes, and audio and visual features are described using MPEG-7 Descriptors.

Figure 4:
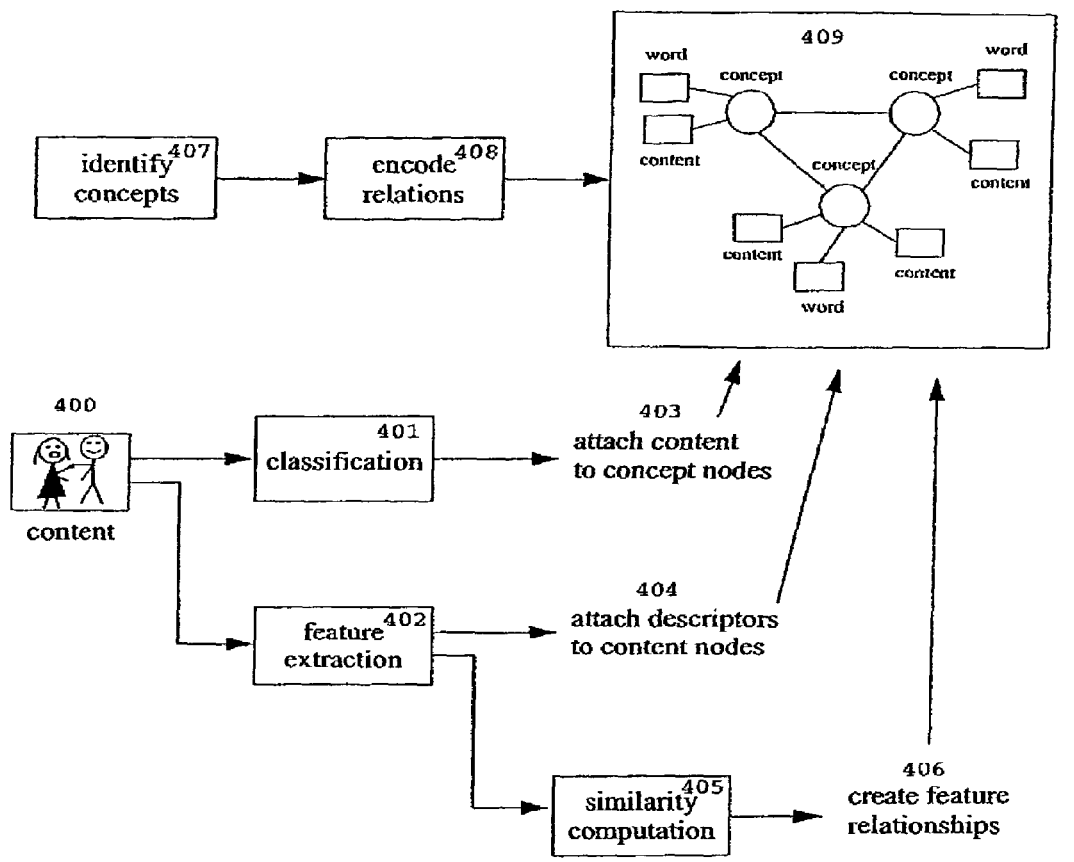
FIG. 4 shows a process for creating a media network knowledge representation.

Referring to FIG. 4, there is shown one example process for creating a media network knowledge representation. This process assumes that a lexical network knowledge representation such as WORDNET is already constructed using a process such as that shown in steps (407) and (408) in which concepts are identified, words are associated with the concepts and the lexical and semantic relationships are encoded. This forms the initial media network knowledge representation (111). The process continues by supplying multimedia content (400) to the classification system in step (401) which classifies the content by associating concepts and words with the content. The classification system can be a manual process in which a human ascribes labels to the content. Alternatively, the classification system can be fully automated in which the content is assigned different labels on the basis of its automatically extracted features. The extraction of features of multimedia is a well-known process in the case of a large number of feature descriptors, such as color histograms, shape signatures, edge direction histograms, or texture descriptors, in which the feature descriptors are generated by processing the multimedia signals. Finally, there are solutions that are semiautomatic in which a human with assistance of a computer classifies the content. Given the results of the classification, in step (403), the content is attached to the concept nodes of the media network knowledge representation (111).

The process continues by supplying multimedia content (400) to the feature extraction system in step (402) which analyzes the content and extracts descriptors of the audio or visual features of the content. Example features include color, texture, shape, motion, melody, and so forth. Example descriptors include color histogram and Fourier moments. Given the results of the feature extraction, in step (404), the descriptors are associated with the content nodes of the media network knowledge representation. Finally, the descriptors are supplied to the similarity computation system in step (405) which computes the similarity of the content based on the values of the descriptors. The similarity may be derived by computing the distance between the multi-dimensional vectors that represent the feature descriptors. For example, the Euclidean distance metric, walk-metric, or quadratic-form distance metric may be used. The value of the similarity measurement may be used to assign a particular strength to an arc in the multimedia network. This may have the consequence of making some arcs more important than others. Furthermore, multiple arcs may be defined between content nodes in the case that multiple features are described. For example, one arc may correspond to the texture similarity, while another arc may refer to the shape similarity. Furthermore, arcs may also correspond to an integration of features, such as referring to the joint similarity in terms of color and shape. Given the results of the similarity computation, in step (406), the feature similarity is represented as relationships or arcs in the media network knowledge representation (409).

Figure 5:
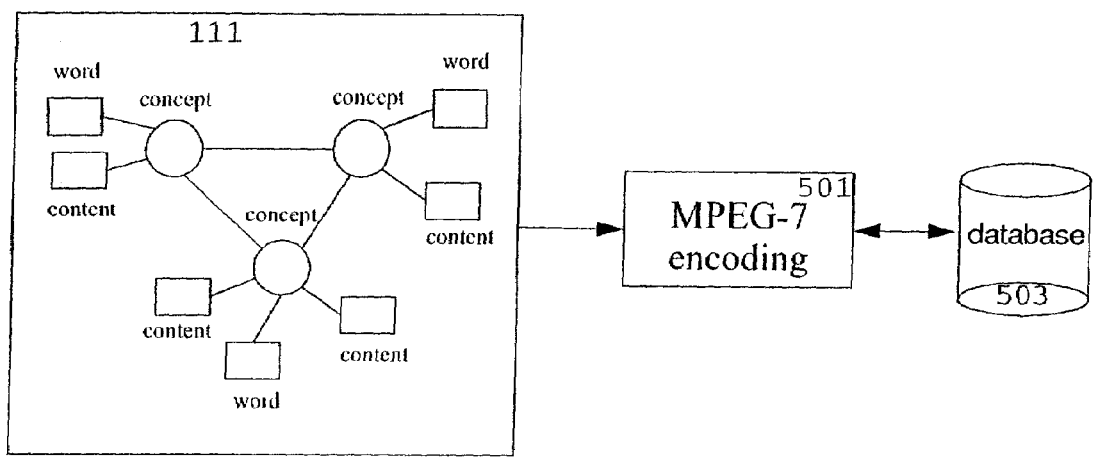
FIG. 5 shows a process for encoding a media network knowledge representation.

Referring to FIG. 5, the media network knowledge representation can be encoded (501) using the ISO MPEG7 Description Definition Language (DDL) as shown in Table 1 to provide an XML representation of the media network knowledge representation (111). The MPEG-7 representation can be further encoded into a compact binary form using the MPEG-7 BiM binary encoding system. Once encoded using MPEG-7, the media network knowledge representation (111) can be stored persistently, such as in a database (503), or can be transmitted over a network, or carried with the multimedia data in a transport stream.

TABLE 1

```
<Mpeg7 xmlns="urn:mpeg:mpeg7:schema:2001" xmlns:mpeg7="urn:mpeg:mpeg7:schema:2001"
    xmlns:xsi="http://www.w3.org/2001/ XMLSchema-instance"
    xsi:schemaLocation="urn:mpeg:mpeg7:schema:2001 .\mdsfdisver3.6.xsd">
  <Description xsi:type="SemanticDescriptionType">
    <Relationships>
      <Node id="node-CA" href="#apple-concept"/>
      <Node id="node-CO" href="#orange-concept"/>
      <Relation type="urn:mpeg:mpeg7:cs:BaseRelationCS:2001:disjoint"
          source="#node-CA" target="#node-CB"/>
    </Relationships>
    <Semantics id="apple-concept">
      <Label>
        <Name> Apple </Name>
      </Label>
      <Property>
        <Name> Crisp </Name>
      </Property>
    </Semantics>
    <Semantics id="orange-concept">
      <Label>
        <Name> Orange </Name>
      </Label>
      <Property>
        <Name> Juicy </Name>
      </Property>
    </Semantics>
  </Description>
  <Description xsi:type="ContentEntityType">
    <Relationships>
      <Node id="node-IA" href=#apple-image"/>
      <Node id="node-IO" href="#orange-image"/>
      <Relation type="urn:mpeg:mpeg7:cs:SemanticRelationCS:2001:similar"
          source="#node-IA" target="#node-IB"/>
    </Relationships>
    <MultimediaContent xsi:type="ImageType">
      <Image id="apple-image">
        <MediaLocator>
          <MediaUri>apple.jpg</MediaUri>
        </MediaLocator>
        <TextAnnotation>
          <FreeTextAnnotation> Photograph of apple </FreeTextAnnotation>
        </TextAnnotation>
        <VisualDescriptor xsi:type="ScalableColorType" numOfCoeff="16"
            numOfBitplanesDiscarded="0">
          <Coeff> 1 2 3 4 5 6 7 8 9 0 1 2 3 4 5 6 </Coeff>
        </VisualDescriptor>
      </Image>
    </MultimediaContent>
    <MultimediaContent xsi:type="ImageType">
      <Image id="orange-image">
        <MediaLocator>
          <MediaUri>orange.jpg</MediaUri>
        </MediaLocator>
        <TextAnnotation>
          <FreeTextAnnotation> Photograph of orange </FreeTextAnnotation>
        </TextAnnotation>
        <VisualDescriptor xsi:type="ScalableColorType" numOfCoeff="16"
            numOfBitplanesDiscarded"0">
          <Coeff> 1 2 3 4 5 6 7 8 9 0 1 2 3 4 5 6 </Coeff>
        </VisualDescriptor>
      </Image>
    </MultimediaContent>
  </Description>
</Mpeg7>
```

Figure 6:
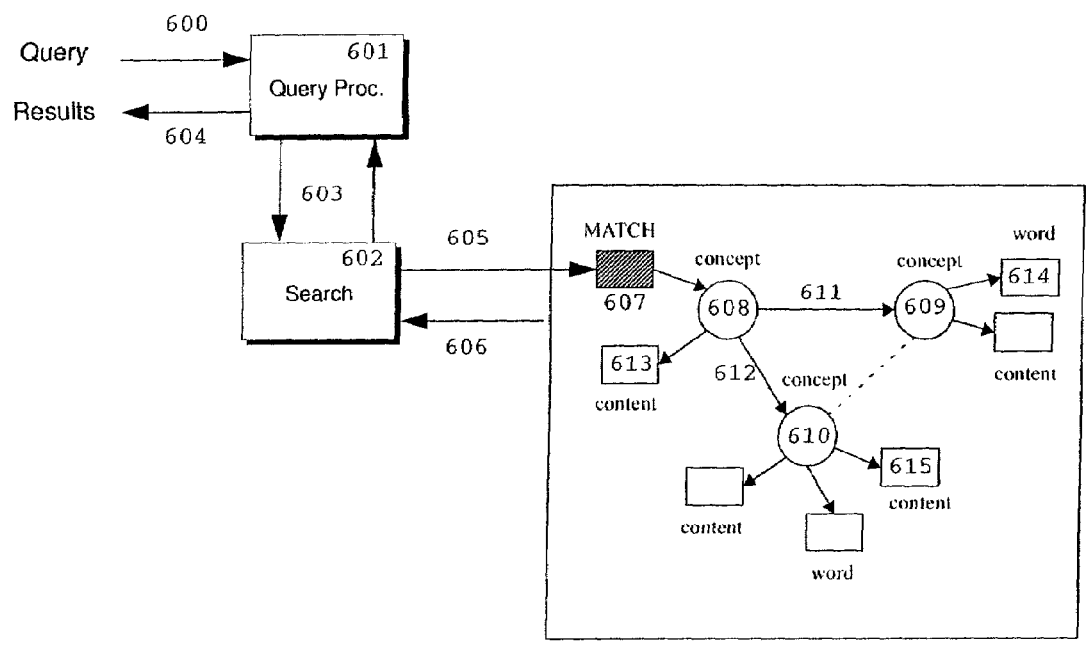
FIG. 6 shows a process for searching a media network knowledge representation.

The media network knowledge representation can be searched as one of the operations of the query processor (101) in a multimedia content-based retrieval system. The process of searching a media network knowledge representation is shown in FIG. 6, the process comprising accepting a query (600) by a query processor for a media network knowledge representation (601) and matching the query to the concepts, content, text, and feature descriptor values of the media network knowledge representation. The query may be provided in the form of concepts, content, text, and/or feature descriptor values. A search engine for a media network knowledge representation (602) may be used to process the matching of the query to the media network knowledge representation.

The matching operation conducted by the search engine (602) may consist of comparing the value of text strings of the query to those of the media network knowledge representation. The matching may involve word-stemming or elimination of stop words to match text in a way which is independent of word form. The matching of the content or feature descriptor values may involve computing of the content similarity or feature distance, such as using a Euclidean distance metric. Once the initial matching concepts, content, text, or feature descriptors are found in the media network knowledge representation, such as the match indicated as (607), the arcs of the media network knowledge representation can be navigated to find other nodes that relate to the initial matching node. The navigation of the arcs may depend on the values of the relationships underlying the arcs, for example, the navigation may follow the arcs denoting high similarity of the connected nodes.

For example, the input query may find an initial match to node (607), which is a word or content node associated with concept (608). Then, the arcs (611 and 612) expanding from (608) are evaluated and traversed to find connected concept nodes (609 and 610). Then, the words and content associated with these nodes (614 and 615) as well as the words and content associated with the initial content node (613) are returned to the search engine in step (606). These items can then be returned by the query processor in step (604).

Figure 7:
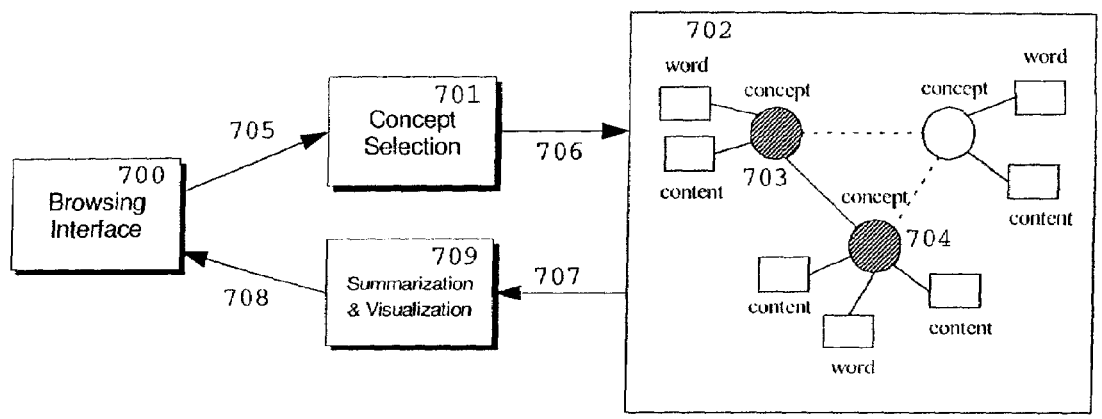
FIG. 7 shows a process for browsing a media network knowledge representation.

The media network knowledge representation can be browsed as one of the operations of the query processor (101) in a multimedia content-based retrieval system. The browsing consists of displaying one or more concept nodes and associated words and/or multimedia content from the media network knowledge representation and providing means for allowing user to select related concepts for viewing. For example, with reference to FIG. 7, a user can use browsing interface (700) that visualizes the selection from the media network knowledge representation (702). The visualization may be provided in a graphical form in which the nodes and arcs are drawn as a two-dimensional arrangement on the screen. Alternatively, the visualization may be provided in purely textual form, such as displaying an MPEG-7 description of the selected portions of a media network knowledge representation.

In general, the user uses the browsing interface (700) to make a selection of nodes and arcs for visualization in step (705), the selection is processed in step (701), which may involve a search of the media network knowledge representation as in (602), and the selected nodes and arcs are accessed in step (706). The selection of concept nodes and associated words and/or multimedia content for display may be made on the basis of specific types or values of relations to a particular concept node or associated word or multimedia content. For example, the user may select for browsing all concepts that are "similar" to the concept of "car" or select all content that is related to the concept of "animals." An example selection of nodes is shown in (703 and 704). The selected nodes and arcs are then returned to the user in steps (707 and 708) and are displayed in the browsing interface (700) allowing further selection and browsing.

Optionally, the selected nodes and arcs can be summarized in step (709) in conjunction with visualization to present the results to the user. For example, in making the summaries it is possible to collapse multiple associated nodes into a single expandable node and provide interface controls that allow the user to interactively expand those nodes. In general, the summarization of the media network knowledge representation consists of consolidating together selected concept nodes, relations, words, and/or multimedia content from the media network knowledge representation.

Figure 8:
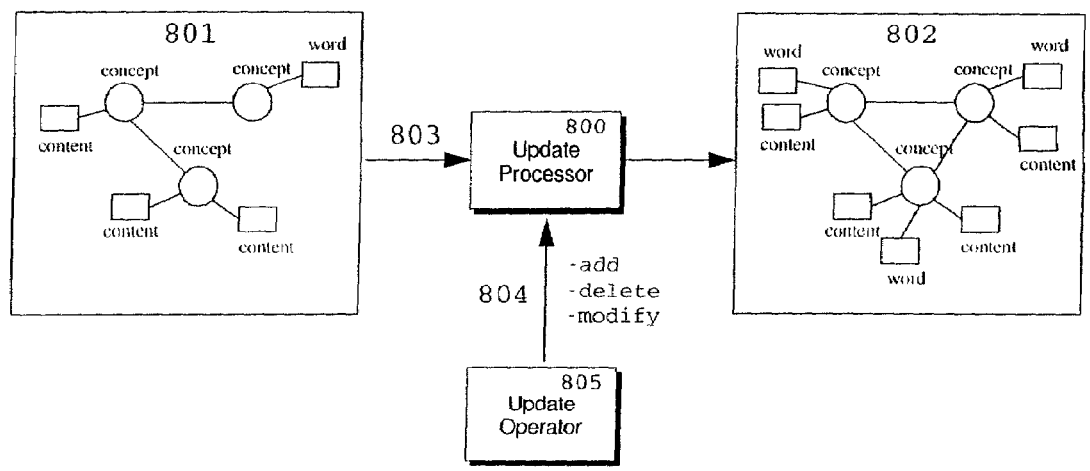
FIG. 8 shows a process for updating a media network knowledge representation.

As shown in FIG. 8, the media network knowledge representation can be updated by adding, deleting or modifying concepts, relations, or associated words, multimedia content, or descriptors in the encoded media network knowledge representation. The update processor (800) takes as input a set of nodes and arcs (801) that corresponds the concepts, relations, associated words, multimedia content, or descriptors, and an update operator (805) and applies the updates to a target media network knowledge representation (802). For example, the input set of nodes and arcs may contain new values that are to be added to an existing media network knowledge representation. In this case, an update operator of "add" indicates to the update processor (800) that the nodes and arcs should be added to the media network knowledge representation (802). Alternatively, the "delete" operator indicates that the nodes and arcs should be deleted, while the "modify" operator indicates that the values in the media network knowledge representation (802) should be changed to the new values given in the input nodes and arcs (801).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The invention has been described with reference to preferred embodiments. It will be apparent that one having skill in the art could make modifications without departing from the spirit and scope of the invention as set forth in the appended claims.

The invention claimed is:

1. A method implemented by at least one computer for encoding knowledge, comprising the steps of:

forming a network having nodes that represent semantic concepts;

associating one or more words with one or more of the nodes;

associating multimedia content with one or more of the nodes;

representing relationships between the nodes as arcs between associated words and arcs between associated multimedia content;

receiving a user query for at least one semantic concept;

recursively searching the network for matching multimedia content within the network related to the user query; and creating a new multimedia presentation from the matching multimedia content within the network.

2. The method of claim 1, further comprising:

creating lexical relations between semantic concepts on the basis of one or more of: word forms and word meaning of associated words.

3. The method of claim 1, wherein relationships between semantic concepts and between associated content are based at least in part on audio and/or visual feature descriptor values.

4. The method of claim 3, further comprising:

extracting feature descriptors from multimedia content; and computing similarity measures between descriptor values.

5. The method of claim 1, wherein the media network knowledge is represented using the ISO MPEG-7 Description Definition Language.

6. The method of claim 1, wherein the relationships between the nodes are based, at least in part, on the features of the multimedia content.

7. The method of claim 1, wherein the relationships between the nodes denote similarity of semantic concepts.

8. The method of claim 1, further comprising displaying the new multimedia presentation on a monitor.

9. A method implemented by at least one computer for searching an encoded media network knowledge representation that comprises a network having nodes that represent semantic concepts, one or more words and multimedia associated with the one or more nodes, and wherein relationships between the nodes are represented as arcs between associated words and arcs between associated multimedia content, the method comprising the steps of:

accepting a query;

matching the query to the words and multimedia content related to the concepts encoded in the media network knowledge representation;

navigating the relationship arcs of the concepts associated with matching words and multimedia content;

retrieving related concepts, words, and multimedia content from the matched nodes or related nodes;

creating a new multimedia presentation from the matching related concepts, words, and multimedia content.

10. The method of claim 9, further comprising:

forming a query comprised of words; and matching the query words to the words encoded in the media network knowledge representation.

11. The method of claim 9, further comprising:

forming a query comprised of multimedia content; and matching the query content to the multimedia content encoded in the media network knowledge representation.

12. The method of claim 9, further comprising:

forming a query comprised of audio and/or visual feature descriptor values, wherein the feature descriptor values denote proximity to the semantic concepts of the nodes; and matching the query descriptor values to the descriptor values of the content encoded in the media network knowledge representation.

13. A computer-implemented method for browsing an encoded media network knowledge representation that comprises a network having nodes that represent semantic concepts, one or more words and multimedia associated with the one or more nodes, and wherein relationships between the nodes are represented as arcs between associated words and arcs between associated multimedia content, the method comprising the steps of:

displaying one or more concept nodes and associated words and/or multimedia content;

providing means for allowing a user to select related concepts for viewing;

receiving a user query for at least one semantic concept;

recursively searching the network for matching multimedia content within the network related to the user query; and creating a new multimedia presentation from the matching multimedia content within the network.

14. The method of claim 13, further comprising:

providing means for allowing the user to select concept nodes and associated words and/or multimedia content for display on the basis of specific types or values of relations to a particular concept node or associated word or multimedia content.

15. A method implemented by at least one computer for summarizing an encoded media network knowledge representation that comprises a network having nodes that represent semantic concepts, one or more words and multimedia associated with the one or more nodes, and wherein relationships between the nodes are represented as arcs between associated words and arcs between associated multimedia content, the method comprising the steps of:

extracting a subset of nodes, relations, and words and/or multimedia content from an encoded media network knowledge representation;

receiving a user query for at least one semantic concept;

recursively searching the network for matching multimedia content within the network related to the user query; and creating a new multimedia presentation from the matching multimedia content within the network.

16. The method of claim 15, further comprising:

consolidating together concept nodes, relations, words, and/or multimedia content.

17. A method implemented by at least one computer for updating an encoded media network knowledge representation that comprises a network having nodes that represent semantic concepts, one or more words and multimedia associated with the one or more nodes, and wherein relationships between the nodes are represented as arcs between associated words and arcs between associated multimedia content, the method comprising the steps of:

adding, deleting or modifying concepts, relations, or associated words, multimedia content, or descriptors in the encoded media network knowledge representation;

receiving a user query for at least one semantic concept;

recursively searching the network for matching multimedia content within the network related to the user query; and creating a new multimedia presentation from the matching multimedia content within the network.

18. A method implemented by at least one computer for querying a multimedia information repository associated with an encoded media network knowledge representation that comprises an encoded network having nodes that represent semantic concepts, one or more words and multimedia associated with the one or more nodes, and wherein relationships between the nodes are represented as arcs between associated words and arcs between associated multimedia content, the method comprising the steps of:

- searching the encoded media network knowledge representation;
- retrieving words, content, and/or descriptors from the media network knowledge representation;
- searching the information repository using the retrieved words, content, and/or descriptors; and
- creating a new multimedia presentation from the retrieved words, content, and/or descriptors within the network.

19. A method implemented by at least one computer for personalizing multimedia information in a system comprising an encoded media network knowledge representation that includes an encoded network having nodes that represent semantic concepts, one or more words and multimedia associated with the one or more nodes, and wherein relationships between the nodes are represented as arcs between associated words and arcs between associated multimedia content, the method comprising the steps of:

- describing the multimedia information using words or descriptors;
- describing user preferences using words, multimedia content, and/or descriptors;
- matching the user preferences with the descriptions of the multimedia information; and extracting, retrieving, and/or summarizing the matched multimedia items; and
- creating a new multimedia presentation from the matched multimedia items.

20. A computer program product in a computer readable medium for use for encoding knowledge, the computer program product comprising:

- first instructions for forming a network having logical nodes that represent semantic concepts;
- second instructions for associating one or more words with one or more of the nodes;
- third instructions for associating multimedia content with one or more of the nodes;
- fourth instructions for representing relationships between the nodes as arcs between associated words and arcs between associated multimedia content;
- fifth instructions for receiving a user query for at least one semantic concept;
- sixth instructions for recursively searching the network for matching multimedia content within the network related to the user query; and
- seventh instructions for creating a new multimedia presentation from the matching multimedia content within the network.

* * * * *